Figure 1:
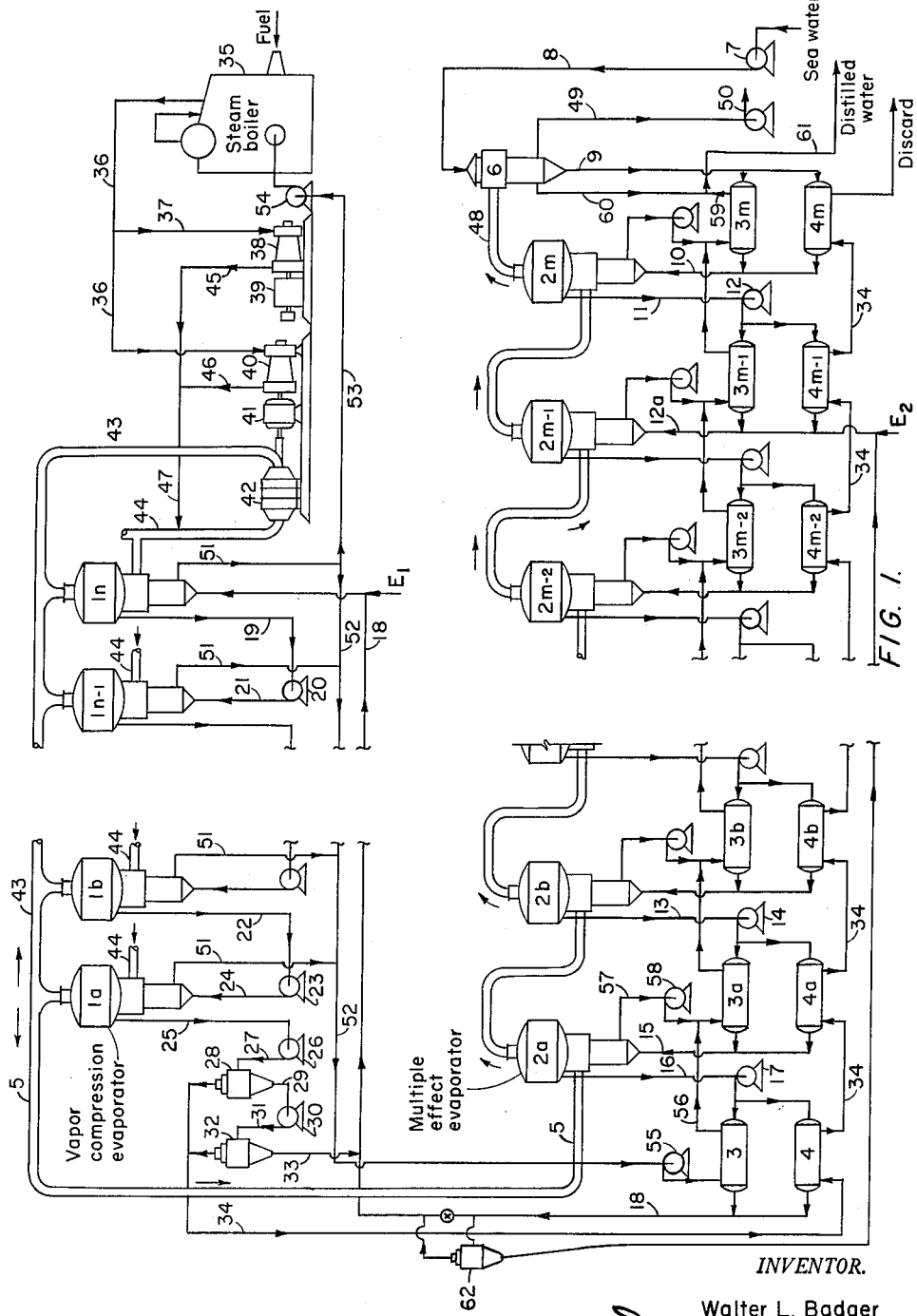

INVENTOR.
Walter L. Badger

United States Patent Office 2,979,442
Patented Apr. 11, 1961

2,979,442

PROCESS FOR THE PREVENTION OF SCALE IN SEA WATER EVAPORATORS

Walter L. Badger, Ann Arbor, Mich., assignor to the United States of America as represented by the Secretary of the Interior Filed June 28, 1957, Ser. No. 668,824

4 Claims. (Cl. 202—57)

The invention herein described and claimed may be manufactured and used by or for the Government of the United States of America for governmental purposes without the payment of royalties thereon or therefor.

This invention relates to the prevention of scale deposits on the heat exchange surfaces of evaporators. It will be discussed in terms of the evaporation of sea water, but it is understood that it is to apply to aqueous solutions containing relatively large amounts of scale-forming ingredients.

It is known (U.S. Patents 925,283 and 1,059,431) to treat boiler water for steam generation by preheating raw feed water to precipitate bicarbonates. The precipitate, with or without the feed water from which it is obtained is then introduced into the boiler. Scale then forms on the particles of precipitate instead of on the heat transfer surfaces.

The problem of treating sea water to prevent scale on heat transfer surfaces is entirely different in view of the vast differences between a water suitable for a boiler feed and sea water. The scale produced in a sea water evaporator is different in character from that produced in a steam boiler. Among the reasons for this difference are: (1) seat water contains many times the quantity of salts contained in fresh water: (2) the temperatures employed in evaporating sea water are lower than those employed in steam boilers, i.e., generally less than 240° F. as against up to 700° F.; (3) for the same volume of vapor produced, the volume of water handled by evaporators is much greater than the quantity of fresh water handled by a steam boiler, and therefore the amount of scaling in the evaporator for this reason alone would be much greater; and (4) sea water in contrast to many boiler feed waters, does not precipitate scale on simple heating, but must be partly concentrated first.

The general mechanism of scale formation is well known. It is known that, when a solution is heated or boiled by means of heat that passes through a heating surface and where the solution is moving past this heating surface, a film is set up immediately adjacent to the heating surface in which the velocities are probably zero at the surface itself, and throughout this film are lower than the velocities of the mass of the liquid. The outer boundary of such a film is probably an indefinite layer, partly in turbulent and partly in viscous flow, and therefore a precise figure cannot be ascribed to the actual film thickness. From its resistance to heat transfer its equivalent thickness can easily be calculated.

Since this film is in viscous flow, heat can pass through it only by conduction. Since water, aqueous solutions, and non-aqueous liquids have very low thermal conductivities, it follows that there is an appreciable temperature drop across this film. The layers immediately in contact with the heating surface are the hottest, and the outer layers of the film approximate the average temperature of the bulk of the liquid.

The substances that may be in solution may be classified into two general groups; those substances that have a normal solubility curve and those substances that have an inverted solubility curve. By a normal solubility curve is meant a solubility that increases with increasing temperature; by an inverted solubility curve is meant that the solubility decreases with increasing temperature. In the case of substances having a normal solubility curve, the hottest layers of the film have the greatest solubility and consequently if the substance in solution is to precipitate, this precipitation will occur at the lowest temperature of the system—namely, in the bulk of the liquid. On the other hand, if a substance having an inverted solubility curve is present, its solubility will be the least in the hottest layers and therefore it is in these layers that precipitation will begin. The first particles to crystallize will crystalize in pores, depressions and cracks in the heating surface, and from these as nuclei the crystallization will spread over the whole of the surface, but the layer of solid will be bonded to the surface by the initial crystallization and therefore a dense coherent scale is usually formed. The formation of scale, therefore, is not( as is often supposed) due to the presence of substances having low solubilities, but generally on the presence of substances having an inverted solubility curve. Thus, sodium sulfate at temperatures above 95° C. has an inverted solubility curve. If solutions of sodium sulfate are boiled at temperatures above 95° C., a hard coherent typical scale will be formed, in spite of the fact that sodium sulfate is a readily soluble substance.

In general, however, the substances most frequently occurring in scale, and especially in the scale produced by the evaporation of sea water, are calcium sulfate. calcium carbonate, and magnesium hydroxides. Calcium sulfate, in particualr, is a source of scale in many commercial operations. Calcium sulfate in the modification normally present in the evaporators has an inverted solubility curve, and therefore is a true scale former. Little is known about the solubility of calcium carbonate as such, but in solutions free from $CO_2$ calcium carbonate has a normal solubility curve. Therefore, it does not form scale but either deposits as mud or as loose layers on the heating surface, not bonded to it but easily removed by washing or brushing. The fact that calcium carbonate appears as an important constituent in many scales in practice is due to the fact that such scales are formed mainly of calcium sulfate but entangle in them solid particles of calcium carbonate.

It has been proven in the case of calcium sulfate that, if a sufficient degree of turbulence is set up and if a sufficient number of seed crystals or nuclei of calcium sulfate are present in the liquid, all of the calcium sulfate can be made to deposit on these seed crystals and thus eliminate the formation of hard adherent calcium sulfate scale. There must be so many seed crystals present and a sufficient velocity in the liquid so that, due to turbulence, these seed crystals are made to penetrate the stagnant film from time to time, and crystallization normally takes place more readily on these seed crystals than on the heating surface. This was described in U.S. Patent 1,399,845 of December 13, 1921, which is specific to calcium sulfate. In this process evaporators for making common salt are ordinarily fed with a solution saturated with calcium sulfate. Scale formation on heat transfer surfaces is substantially prevented thereby.

In the evaporation of sea water, a totally different set of circumstances are found. The calcium is present primarily as calcium bicarbonate and is held in that form by the presence of dissolved carbon dioxide. During the early stages of the evaporation of sea water no scale is formed, but there subsequently appears a range of concentrations in which calcium carbonate scales appear. This is due to the removal of dissolved $CO_2$ by boiling and the gradual upsetting of the equilibrium between calcium carbonate and calcium bicarbonate, so that the extremely insoluble calcium carbonate is thrown down. If the picture of the mechanism of scale formation outlined above should be considered, it would appear that in the hottest layers there will be less carbon dioxide, more shift towards neutral calcium carbonate, and therefore under such circumstances calcium carbonate could form a hard coherent scale. If evaporation is continued, by the time most of the calcium carbonate has been precipitated the limiting solubility of calcium sulfate has been reached, and therefore in the later stages of the evaporation of sea water true calcium sulfate scales appear.

In some cases in the evaporation of sea water, it has been found that magnesium hydroxide scales appear. This is particularly noted when the sea water has been concentrated to a certain extent, but short of the point where calcium sulfate scale appears. It has also been found primarily when the evaporation takes place in the higher parts of the usual temperature range. This, like the deposition of calcium carbonate scale, is not the result of the presence of a material having an inverted solubility curve. As evaporation proceeds and goes to higher temperatures, carbon dioxide is evolved from the solution as mentioned above. It is also known that as the carbon dioxide is removed from the solution, the concentration of hydroxyl ions increases. The magnesium compounds are present probably as magnesium sulfate, which is quite soluble and has a normal solubility curve. However, magnesium hydroxide is relatively insoluble, and as the concentration of hydroxyl ions increases, the tendency for magnesium hydroxide precipitation increases. Since the concentration of carbon dioxide is the least (and therefore the concentration of hydroxyl ions is the greatest) in the hottest layers nearest the heating surface, conditions for scale formation are again present; in that the tendency for precipitation is greatest in the hottest layers, which are the layers immediately in contact with the heating surface and which therefore tend to bind the precipitated material to the surface in the form of scale.

Because the mechanism of scale formation is so different between calcium carbonate and magnesium hydroxide on the one hand, and calcium sulfate on the other, it could not have been predicted that the method by which calcium sulfate scale has been prevented would be effective in the prevention of calcium carbonate or magnesium hydroxide scale. I have found, however, that in the evaporation of sea water if the sludge precipitated from more concentrated solutions (but still consisting primarily of calcium carbonate and magnesium hydroxide) is removed from the relatively concentrated solutions and this sludge reintroduced into the more dilute solutions, it can prevent the formation of calcium carbonate and magnesium hydroxide scale.

It is an object of this invention to provide a method for distilling sea water wherein hard scale formation is substantially prevented. It is a further object of this invention to prevent scale formation in the distillation of sea water so that long tube vertical evaporators may be effectively employed. It is a further object of this invention to prevent scale from depositing on the heat transfer surfaces of a sea-water evaporator by maintaining in suspension in the said sea-water the scale forming ingredients, which comprise calcium carbonate, magnesium hydroxide and calcium sulfate, either alone or in an admixture. It is a further object to separate the scale forming ingredients during the distillation process, and recirculating them to the various evaporating stages.

Further objectives will become apparent from a consideration of the disclosure and drawing, together with the appended claims.

Figure 2:
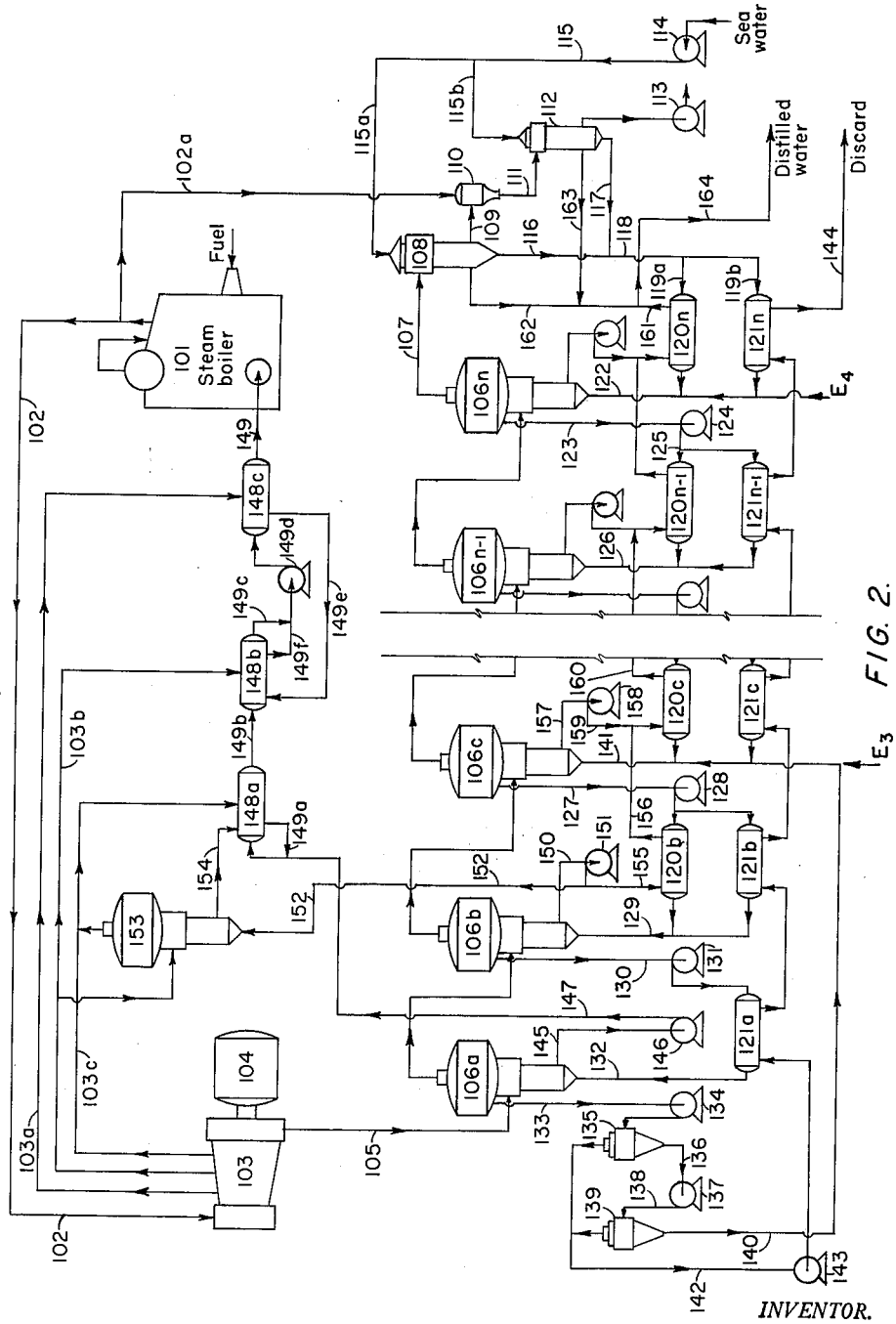

To illustrate the application of my invention, Figures 1 and 2, which are schematic flow diagrams, represent two embodiments thereof for the evaporation of sea water. Figure 1 shows a combination of a thermocompression evaporator and an ordinary multiple effect evaporator, while Figure 2 shows a cycle in which power is generated for other purposes and the exhaust from the power unit is employed for the operation of a multiple effect evaporator.

In Figure 1 several single effect thermocompression evaporators indicated as $1a$, $1b$ . . . $1n-1$, $1n$, are shown. These are single effect thermocompression evaporators operated in parallel as to steam but in series as to liquid feed. The number depends on the specific conditions which are desirable to maintain. There is also shown a multiple effect evaporator having bodies $2a$, $2b$ . . . $2m-2$, $2m-1$, and $2m$. The number of bodies in the multiple effect evaporator may be varied according to the conditions of the problem. This is a standard multiple effect evaporator with what is known as backward feed.

There are a series of ordinary tubular heat exchangers shown as 3, $3a$, $3b$ . . . $3m-2$, $3m-1$, and $3m$, and another series of similar tubular heat exchangers indicated as 4, $4a$, $4b$ . . . $4m-2$, $4m-1$, and $4m$. The multiple effect evaporator is heated with steam at pressures in the general neighborhood of atmospheric, and this low pressure steam enters through line 5; the source of this steam being described later. At the end of the evaporators there is a surface condenser 6 of usual design. A pump 7 draws sea water into the system and discharges it by line 8 to surface condenser 6, where it serves as the cooling medium for condensing the final vapor from evaporator body $2m$. The partly warmed sea water then leaves condenser 6 through line 9, goes through heaters $3m$ and $4m$ in parallel, leaves these heaters through line 10, and becomes the feed to evaporator bodies are all of the type generally known as the long tube vertical evaporator. On its passage through evaporator body $2m$, it is partially concentrated, leaves through line 11, pump 12, is passed through heaters $3m-1$ and $4m-1$ in parallel, leaves then through line $12a$ and becomes the feed to evaporator body $2m-1$. The further progress of the feed solution is in a similar manner, so that the liquid leaving evaporator body $2b$ through line 13 and pump 14 passes through heaters $3a$ and $4a$ in parallel, their discharge is combined in line 15, which is fed to evaporator body $2a$. From evaporator body $2a$ the concentrated liquid leaves through line 16 pump 17, goes through heaters 3 and 4 in parallel, and leaves through line 18. From line 18 it is fed to evaporator body $1n$ leaves through line 19, pump 20, and line 21 to become the feed to thermocompression evaporator body $1n-1$. In a similar way, the concentrated liquid passes through all the bodies $1n$ to $1a$, leaving body $1b$ through line 22, pump 23, line 24 to become the feed to evaporator body $1a$. The discard from $1a$ which is now fully concentrated material, leaves through line 25, pump 26, and line 27 and goes to a separator 28. This separator may be of any design known to the art. The thickened slurry of sludge leaves through line 29, pump 30, and line 31 to separator 32. The discard of this second thickener, leaving through line 33, in a thickened slurry of the scale-forming ingredients produced by evaporation, comprising mainly calcium carbonate and magnesium hydroxide, and in Figure 1 it is shown as introduced into line 18 to be fed with the rest of the partly concentrated liquid through evaporator bodies $1n$ to $1a$ in series. The overflow from separators 28 and 32 passes through line 34 and goes through heaters 4, $4a$, $4b$ . . . $4m-2$, $4m-1$ and $4m$, giving up its heat in this process step by step to the feed solution passing through these heaters in the opposite direction. The final concentrated solution leaving heater $4m$ is discarded.

Buildup of slurry in evaporators $1n$ to $1a$ is avoided in normal operation generally by the overflow of a portion of the slurry in thickeners 28 and 32, and its removal via line 34. Should a greater proportion of slurry overflow through 34 be required at any stage of operation (e.g., a lesser amount of slurry recycle), this can be achieved by restricting the discharge through line 33, as by closing a valve (not shown).

A steam boiler 35 raises steam at whatever pressure is needed or desired, and may in many cases be at pressures from 600 to 800 pounds gage, but the precise pressure employed depends on the conditions of the problem and may be varied even outside the limits mentioned above. This steam leaves through line 36 and a portion of it goes through line 37 to a steam turbine 38, which drives a generator 39, and this generator supplies power for pumps and other uses in the system. The rest of the steam in line 36 goes to steam turbine 40, which through a reducing gear 41 drives an axial-flow steam compressor 42. This steam compressor takes vapor from evaporators $1a$ to $1n$ through line 43 and compresses it, discarding it through line 44. Line 44 has a number of branches (not shown) leading to each of the vapor compression evaporators $1a$ to $1n$. Exhaust from turbine 38 leaves through line 45, is combined with exhaust from turbine 40, leaving through line 46, and the combined exhaust from lines 45 and 46 are conducted by line 47 and added to the compressor discharge in line 44.

The amount of steam leaving the compressor through line 44 is greater than the amount of steam entering compressor in line 43, since the steam returned by line 43 is supplemented by exhaust from line 47. The total amount of steam in line 44 will evaporate more water in the thermocompression evaporators than is drawn as vapor by the compressor through line 43. Excess steam leaves through line 5 and is the steam used for heating evaporator bodies $2a$ to $2m$. This follows the usual path of steam through a multiple effect evaporator, and the final vapor from evaporator body $2m$ leaves through line 48 to surface condenser 6. Noncondensed gases are withdrawn from condenser 6 by line 49 and vacuum pump 50.

Condensate from the vapor evaporators $1a$ to $1n$ leaves through lines 51 and is collected in a header 52. Sufficient condensate to be needed for boiler feed is diverted from header 52 through line 53 and pump 54, and is fed to steam boiler 35. The rest of the condensate from line 52 passes to pump 55 heat exchanger 3, and goes by line 56 to heater $3a$. Here it is joined by condensate from body $2a$ through line 57 and pump 58, goes through heater $3a$ and so on through heater $3m-1$. In its path through these heaters in series, it is augmented at each effect by the condensate from that effect until it leaves heater $3m$ through line 59. Here it is joined by condensate from surface condenser 6 in line 60, and the combined condensate leaves through line 61 as distilled water, the product of the system.

The operation of single effect vapor compression evaporators as shown in this flowsheet is well known in the art. The subdivision of the thermocompression evaporator to several bodies operating in parallel, but in series on feed, is also known in the art. The purpose of this is to isolate the effects of concentration and boiling point elevation largely in one evaporator body, in this case body $1a$. The combination of a vapor compression evaporator with a multiple effect evaporator, the multiple effect evaporator being operated essentially on exhaust from the units that produce the compression (whether they be rotary blowers, reciprocating compressors or steam jet compressors), or on excess vapor from a thermocompression evaporator is also well known.

The long tube vertical evaporator shown in these drawings is the cheapest form of evaporator, and the use of it instead of other forms of evaporators contributes essentially to the economic feasibility of the process. It has, however, generally been assumed that the long tube vertical evaporator is not feasible where scale will form. Consequently, the method that I have shown here involving the use of long tube vertical evaporators is only feasible in case long tube verticals can be operated on sea water without scale. With the system described, where sludge is separated from a concentrated solution and returned to the cycle, scale can be prevented.

It will be first assumed that such a system as shown in Figure 1 concentrates sea water to a point short of the concentration where calcium sulfate scale appears. It will also be assumed that the capacities of evaporators 1 and 2 are so balanced that no serious scale problems will be met in evaporator 2, and the scale could only form in evaporator 1. In such a case, the slurry in line 33 is discharged into line 18, and therefore fed through the various bodies of evaporator 1 in series to prevent scale there. It is equally possible (if it is suspected that scale may form in any of the bodies of evaporator 2) that the slurry in 33 instead of being discharged into line 18 may be discharged into any one of the pumps such as 12, 14 or 17, or any others in the cycle in order to introduce the sludge before the point where carbonate scale may form.

If the concentration is to be carried so far that the limit of solubility of calcium sulfate is passed so that certain evaporator bodies might produce calcium sulfate scale, then it would be desirable to so balance the capacity of the thermocompression evaporators 1 and the multiple effect evaporators 2 that sulfate scale would be produced only in particular evaporators, say the thermocompression evaporators $1a$ to $1n$. In such a case the cycle shown in Figure 1 would be applied, but it would be desirable, instead of sending concentrated liquid through line 18 from the multiple effect to the thermocompression evaporators, to remove the

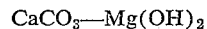

$$CaCO_3-Mg(OH)_2$$

sludge from the concentrated liquid leaving heaters 3 and 4, before sludge from 33 is admitted to line 18. A centrifugal separator 62 in line 18 removes this carbonate sludge, which may be recycled to any evaporator body $2a$ to $2m$, $2m-1$ being shown.

As a further embodiment of my invention, the system shown in Figure 2 will be described. Here a steam boiler 101 generates steam at pressures in the same general range as those mentioned in connection with Figure 1. It sends this high pressure steam primarily through line 102 to steam turbine 103, which drives generator 104. A small part of the current generated in generator 104 is used to operate pumps and other devices in the rest of the cycle, but the greater part of the current produced in generator 104 is to be sold or used elsewhere; so that the value of this power becomes a credit to the distilled water system.

The exhaust from turbine 103, going through line 105, is sent to a multiple effect evaporator of any desired number of effects. The bodies of this evaporator are represented as $106a$, $106b$, $106c$ ... $106n-1$ and $106n$. These bodies are shown as the long-tube vertical type. The flow of the steam through this multiple effect evaporator follows the usual scheme for a simple multiple effect evaporator arrangement. Vapor from the effect $106n$ goes through line 107 to surface condenser 108. Noncondensed gases from this condenser go by a line 109 to steam jet ejector 110, which produces the final vacuum. This ejector is actuated by high-pressure steam taken from boiler 101 by line $102a$. The discharge from ejector 110 goes through line 111 to surface condenser 112, and the noncondensed gases are removed from condenser 112 by vacuum pump 113 which discharges them into the air.

Sea water is drawn in by pump 114 and sent by line 115 to the main surface condenser by line $115a$, and to the after condenser 112 by line $115b$. Partly warmed sea water, which issues from these condensers in lines 116 and 117, is combined in line 118 and then split in two parts in lines $119a$ and $119b$.

The evaporator is provided with a series of tubular heat exchangers $120b$, $120c$ ... $120n-1$ and $120n$, and a second set of similar tubular heat exchangers $121a$, $121b$, $121c$ ... $121n-1$ and $121n$. Lines $119a$ and $119b$ feed sea water into the heat exchangers $120n$ and $121n$ from which it issues in two streams to be combined in line 122, which is fed to the evaporator 106n. Partly concentrated solution leaves evaporator 106n by line 123, pump 124, and line 125 to be split into two streams which go through heat exchangers 120n–1 and 121n–1 in parallel, are combined into one stream in line 126 and are fed to evaporator 106n–1. The same process goes on through all effects in the system. The partly concentrated liquid from evaporator 106c goes through line 127, pump 128, and heat exchangers 120b and 121b to be combined into line 129, which is fed to evaporator 106b. The discharge from evaporator 106b through line 130 goes through pump 131, heater 121a, and line 132 to become feed to evaporator 106a.

The liquid at final concentration discharged from evaporator 106a through line 133 is pumped by pump 134 into centrifugal separator 135. The thickened underflow containing sludge is transferred by line 136, pump 137, and line 138 to a second similar separator 139. The underflow from the separator 139, which is now a thickened slurry of the scale-forming ingredients deposited throughout the system, is sent by line 140 to such a point in the feed circulating system as to introduce it into that multiple effect evaporator body where scale formation may begin. In Figure 2 this is shown as being introduced into line 141, which is the feed line to body 106c. Since body 106c will be at a lower pressure than 106a, no pump is necessary in this line. It is obvious that instead of returning the sludge to body 106c, it may be returned to any body in the system where scale is expected to begin to form. This might be line 141, line 129, line 126, line 122 or any similar intermediate point in the multiple effect evaporator.

The clear concentrated liquid leaving centrifugal separators 135 and 139 through line 142, goes to pump 143 and is pumped in series through heat exchangers 121a, 121b, 121c . . . 121n–1 and 121n, and is finally discarded from the system through line 144.

Condensate from evaporator 106a leaves through line 145, pump 146, and line 147. Line 147 carries this condensate through a boiler feed preheating system, which may be of any arrangement dictated by good steam boiler practice. In Figure 2 it is shown passing through heater 148a, which is heated by steam from 153 and line 103c. The condensate from the steam is added to the steam of boiler feed 147 by line 149a. The feed water leaves heater via line 149b and enters heater 148b where it is heated by steam from line 103b. The effluent feed water in 149c is combined with the condensate from the heating steam in pipe 149f and pumped into heater 148c by means of pump 149d. Heater 148c is heated by steam from line 103a and the heated feed water is removed via line 149 to boiler 101. The condensed heating steam in 148c is led to heater 148b via line 149e. The number of heaters 148, the number and position of bleeder taps on turbine 103, and the particular flow of condensate through these heaters constitute no part of this invention and will be dictated by good boiler practice.

Condensate from evaporator 106b flows through line 150, pump 151, and is divided into two parts. One part flows through line 152 as feed to make-up evaporator 153. Evaporator 153 is heated by bleeder steam from a tap at the appropriate pressure and discharges its vapors into the system of heaters 148 at any appropriate point. Condensate from evaporator 153 leaves through line 154 and joins the main stream of condensate going to the boiler as boiler feed. The inclusion of this make up evaporator 153 is no part of this invention and its presence or absence from the system depends on the method chosen for preheating boiler feed.

Such part of the condensate from evaporator 106b as is not diverted through line 152 as boiler feed make-up, goes through line 155, through heater 120b, and leaves heater 120b through line 156. Condensate from evaporator 106c leaves through line 157, pump 158, line 159, joins with condensate coming through line 156, goes through heater 120c, leaves heater 120c by line 160, passes through the remaining heaters, to finally leave heater 120n through line 161. Line 161 is joined by condensate from surface condenser 108 through line 162, after-condenser 112 through line 163, and the combined streams from lines 161, 162 and 163 leave the system through line 164 as distilled water, which is the product of the system.

In starting up the evaporator system, extraneously produced finely divided material having the same composition as scale must be added to the appropriate evaporator body or bodies to prevent scale formation. In Fig. 1, are shown lines $E_1$ and $E_2$ through which evaporator bodies 1n and 2m–1, respectively, may receive this extraneously produced material, and lines $E_3$ and $E_4$ shown in Fig. 2, are means through which evaporator bodies 106c and 106n may be similarly supplied. After the system is in full operation, recycling the slurry of scale-forming materials is sufficient for this purpose.

The extraneously added material may be produced by various methods known to the art, which are beyond the scope of this invention. One simple way is to evaporate sea water until scale is produced on the walls or tubes of the evaporator, remove the deposits and grind them with water to make a slurry.

The use of exhaust steam from a noncondensing power-generating unit by using it to heat a multiple effect evaporator is old in the art. The use of feed preheaters to preheat the feed in backward feed arrangement is well known. The use of hot condensate or hot concentrated liquid to preheat the feed is also obvious to anyone skilled in the art. The use of a steam jet ejector and an after condenser to produce the vacuum is well known. Diversions of condensate from the hottest effect to be used as boiler feed is standard practice in evaporator engineering. Diversion of part of the condensate from the next-to-the-hottest evaporator as boiler feed make-up is common practice. The methods of heating feed to a high pressure steam boiler that are commonly used in steam power plant engineering, are highly variable, according to the specific conditions in specific cases, and the particular arrangement shown in the figures is merely exemplary, and is not to be understood as delimiting the scope of the invention.

I claim:

1. In a process for evaporating sea water to obtain fresh water by heating the sea water in an evaporation zone having heat transfer surfaces whereby concentrations of scale forming compounds in the sea water undergo chemical changes on heating to form hard scale deposits, the method of preventing the adhesion of the hard scale deposits on said heat transfer surfaces which comprises introducing a slurry of material of the same composition as the hard scale comprising at least one member of the group consisting of calcium carbonate and magnesium hydroxide, into the evaporation zone to provide therein freely dispersed nuclei and heating the water and slurry in the evaporating zone whereby said hard scale deposits are formed on said nuclei.

2. A process for the evaporation of sea water into a vapor and a distilland in a plurality of evaporating zones, including a first zone, a terminal zone, and a number of intermediate zones therebetween, comprising introducing the sea water into the first zone, introducing extraneously produced finely divided solid material having the composition of sea water scale into one of said evaporating zones to provide therein freely dispersed nuclei in suspension, heating the sea water in said first, and the subsequent intermediate, and terminal zones, passing the sea water distilland as a flow successively from one zone to the next towards the said terminal zone, removing the vapors overhead from each zone, successively increasing the concentration of the sea water distilland in each successive zone, removing the concentrated sea water distilland from the terminal evaporation zone, the said terminal distilland containing a suspension of scale forming materials comprising at least one member of the group consisting of calcium carbonate and magnesium hydroxide, separating a slurry of said scale forming materials from the terminal distilland and recycling the slurry to the said one of the evaporating zones, wherein the concentrated scale forming compounds in the sea water undergo chemical changes on heating to form hard scale deposits on freely dispersed nuclei.

3. A process for the evaporation of sea water into a vapor and a distilland in a plurality of evaporating zones, including a first zone, a terminal zone, and a number of intermediate zones therebetween, comprising introducing the sea water into the first zone, introducing extraneously produced finely divided solid material having the composition of sea water scale into one of said evaporating zones to initially provide therein freely dispersed nuclei, heating the sea water in said first, and the subsequent intermediate, and terminal zones, passing the sea water distilland as a flow successively from one zone to the next towards the said terminal zone, removing the vapors overhead from each zone, successively increasing the concentration of the sea water distilland in each successive zone, removing the concentrated sea water distilland from the terminal evaporation zone, the said terminal distilland containing a suspension of scale forming materials comprising at least one member of the group consisting of calcium carbonate and magnesium hydroxide, separating a slurry of said scale forming materials from the terminal distilland and recycling the slurry to the said one of the evaporating zones to continue the provision therein of freely dispersed nuclei, wherein the concentrated scale forming compounds in the sea water undergo chemical changes on heating to form hard scale deposits on said nuclei.

4. A process for the evaporation of sea water into a vapor and a distilland in a plurality of evaporating zones, including a first zone, a terminal zone, and a number of intermediate zones therebetween, comprising introducing the sea water into the first zone, introducing extraneously produced finely divided solid material having the composition of sea water scale into a predetermined one of said evaporating zones to provide therein freely dispersed nuclei, heating the sea water in said first, subsequent intermediate, and terminal zones, passing the sea water distilland as a flow successively from one zone to the next towards the said terminal zone, removing the vapors overhead from each zone, successively increasing the concentration of the sea water distilland in each successive zone, removing a partially concentrated distilland from one of said intermediate evaporation zones, the partially concentrated distilland containing a suspension of scale forming materials comprising at least one member of the group consisting of calcium carbonate and magnesium hydroxide, separating the scale forming material in the form of slurry from the partially concentrated distilland, leaving a separated distilland, recycling said slurry to the said predetermined one of the evaporating zones to further provide therein freely dispersed nuclei, introducing the said separated distilland together with finely divided calcium sulfate into the evaporating zone next and subsequent in series to the said one of the intermediate zones, removing concentrated sea water distilland from the terminal evaporating zone, said concentrated distilland from said terminal evaporating zone containing calcium sulfate in suspension, removing said calcium sulfate in the form of a slurry from the concentrated terminal distilland and recycling the calcium sulfate slurry to the evaporation zone into which the said separated distilland is introduced.

References Cited in the file of this patent

UNITED STATES PATENTS

| | | |
|---|---|---|
| 743,352 | Trump | Nov. 3, 1903 |
| 1,399,845 | Bull | Dec. 13, 1921 |
| 1,609,853 | Badger | Dec. 7, 1926 |
| 1,613,701 | Hall | Jan. 11, 1927 |
| 2,330,221 | Kermer | Sept. 28, 1943 |
| 2,631,926 | Eckstrom | Mar. 17, 1953 |
| 2,698,225 | Svanoe | Dec. 28, 1954 |
| 2,775,555 | Clarkson | Dec. 25, 1956 |
| 2,856,074 | Dubitzky | Oct. 4, 1958 |
| 2,872,414 | Gray | Feb. 3, 1959 |

FOREIGN PATENTS

| | | |
|---|---|---|
| 534,576 | Canada | Dec. 18, 1956 |